US009026800B2

(12) United States Patent
Rodgers et al.

(10) Patent No.: US 9,026,800 B2
(45) Date of Patent: May 5, 2015

(54) METHOD AND SYSTEM FOR ALLOWING CUSTOMER OR THIRD PARTY TESTING OF SECURE PROGRAMMABLE CODE

(75) Inventors: Stephane Rodgers, San Diego, CA (US); Andrew Dellow, Minchinhampton (GB); Iue-Shuenn Chen, San Diego, CA (US); Xuemin Chen, San Diego, CA (US); Carolyn Walker, Poway, CA (US)

(73) Assignee: Broadcom Corporation, Irvine, CA (US)

( * ) Notice: Subject to any disclaimer, the term of this patent is extended or adjusted under 35 U.S.C. 154(b) by 2454 days.

(21) Appl. No.: 11/743,545

(22) Filed: May 2, 2007

(65) Prior Publication Data

US 2008/0086647 A1 Apr. 10, 2008

Related U.S. Application Data

(60) Provisional application No. 60/828,564, filed on Oct. 6, 2006.

(51) Int. Cl.
*G06F 21/00* (2013.01)
*G06F 21/57* (2013.01)
*G06F 21/60* (2013.01)
*G06F 21/64* (2013.01)
(Continued)

(52) U.S. Cl.
CPC ........ *G06F 21/572* (2013.01); *G06F 2221/033* (2013.01); *G06F 21/60* (2013.01); *G06F 21/64* (2013.01); *G06F 21/121* (2013.01); *G06F 21/10* (2013.01); *G06F 21/12* (2013.01); *H04L 9/0643* (2013.01); *H04L 63/12* (2013.01); *H04L 63/123* (2013.01); *H04N 7/162* (2013.01); *H04N 21/42623* (2013.01); *H04N 21/4586* (2013.01); *H04N 21/4623* (2013.01); *H04N 21/8193* (2013.01)

(58) Field of Classification Search
CPC .................................................. G06F 2221/033
USPC ........................ 713/187, 189, 191; 726/26–30
See application file for complete search history.

(56) References Cited

U.S. PATENT DOCUMENTS 5,452,355 A * 9/1995 Coli ............................... 713/194
5,579,479 A * 11/1996 Plum ............................. 726/28
(Continued)

OTHER PUBLICATIONS

Chen, Yuqun, et al. "Oblivious hashing: A stealthy software integrity verification primitive." Information Hiding. Springer Berlin Heidelberg, 2003.*

*Primary Examiner* — Madhuri Herzog
(74) *Attorney, Agent, or Firm* — Sterne, Kessler, Goldstein & Fox P.L.L.C.

(57) ABSTRACT

Methods and systems for allowing customer or third party testing of secure programmable code are disclosed and may include verifying code loaded in a set-top box utilizing a test hash or a production hash prior to execution of the code, where the test hash and production hash may be stored in a memory, such as an OTP, within the set-top box, and may allow migration from corresponding test code to production code, which may be verified utilizing the test hash and production hash, respectively. The test and production hashes may be customer specific. The migration from test code to production code may be authenticated using at least a set-top box specific password. The test hash may be stored in a first portion of a one-time programmable memory and the production hash in a remaining portion, with the first portion being less than or equal to the remaining portion.

36 Claims, 5 Drawing Sheets

(51) Int. Cl.
*G06F 21/12* (2013.01)
*H04L 9/06* (2006.01)
*H04L 29/06* (2006.01)
*H04N 7/16* (2011.01)
*H04N 21/426* (2011.01)
*H04N 21/458* (2011.01)
*H04N 21/4623* (2011.01)
*H04N 21/81* (2011.01)
*G06F 21/10* (2013.01)

(56) References Cited

U.S. PATENT DOCUMENTS

| | | | |
|---|---|---|---|
| 5,625,693 A * | 4/1997 | Rohatgi et al. | 713/187 |
| 5,850,559 A * | 12/1998 | Angelo et al. | 713/320 |
| 6,862,696 B1 * | 3/2005 | Voas et al. | 714/38 |
| 2003/0163685 A1 * | 8/2003 | Paatero | 713/155 |
| 2004/0230815 A1 * | 11/2004 | Goodman et al. | 713/191 |
| 2006/0101310 A1 * | 5/2006 | Diamant et al. | 714/38 |

* cited by examiner

METHOD AND SYSTEM FOR ALLOWING CUSTOMER OR THIRD PARTY TESTING OF SECURE PROGRAMMABLE CODE

CROSS-REFERENCE TO RELATED APPLICATIONS/INCORPORATION BY REFERENCE

This application makes reference to, claims priority to, and claims the benefit of U.S. Provisional Application Ser. No. 60/828,564 filed on Oct. 6, 2006.

The above state application is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to software security. More specifically, certain embodiments of the invention relate to a method and system for allowing customer or third party testing of secure programmable code.

BACKGROUND OF THE INVENTION

The implementation of fee-based video broadcasting requires a conventional conditional access (CA) system to prevent non-subscribers and unauthorized users from receiving signal broadcasts. Cryptography algorithms may be utilized, for example, in content protection in digital set-top box systems and in other systems utilized in fee-based video broadcasting. Security keys may, therefore, play a significant part in the encryption and/or decryption process initiated by a cryptography algorithm. For each cryptography algorithm used in a fee-based video broadcasting system, there may be a set of associated security keys that may be needed by the algorithm. In a typical set-top box System-on-Chip integrated circuit, for example, depending on the security sub-system within the circuit, the security key generation, and the destination module that uses the security key may be far apart within a chip. For example, a security key generation module may not be within the same design block as the destination module that utilizes the security key. The distance between the security key generation module and the destination module may require a special bus to transmit the security key to the appropriate destinations, which may decrease the speed and efficiency of the circuit.

In an increasingly security conscious world, protecting access to information and/or to systems from unwanted discovery and/or corruption is a major issue for both consumers and businesses. Many consumer or business systems may be vulnerable to unwanted access when the level of security provided within the system is not sufficient for providing the appropriate protection. In this regard, consumer systems, such as multimedia systems, for example, may require the use of integrated architectures that enable security management mechanisms for defining and administering user rights or privileges in order to provide the necessary protection from unwanted access. An example of a multimedia system that may be accessed by many different users may be a set-top box where manufacturers, vendors, operators, and/or home users may have an interest in accessing or restricting at least some limited functionality of the system.

Set-top boxes may be developed for multiple of customers who may have different control programming needs. A security risk may exist if no security is used with control software sent to $2^{nd}$ and $3^{rd}$ parties involved in the development of set-top boxes and related software. If an unauthorized user or hacker were to gain access to non-secured control software, all set-top boxes with the same control software may be in danger of being compromised. Additionally, functions specific to a particular customer should not be accessible to other customers.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for allowing customer or third party testing of secure programmable code, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for allowing customer or third party testing of secure programmable code. Exemplary aspects of the invention include verifying code loaded in a set-top box utilizing a test hash or a production hash prior to execution of the code, where the test hash and production hash may be stored in a memory, such as an OTP, within the set-top box. The invention may allow migration from test code to production code, which may be verified utilizing the test hash and production hash, respectively. The test and production hashes may be customer specific, or the test hash may be generic, or common to multiple customers, or users, and the production hash may be customer, or user specific. The migration from test code to production code may be authenticated using at least a set-top box specific password. The test hash may be stored in a first portion of a one-time programmable memory and the production hash in a remaining portion, with the first portion being less than or equal to the remaining portion.

Figure 1:
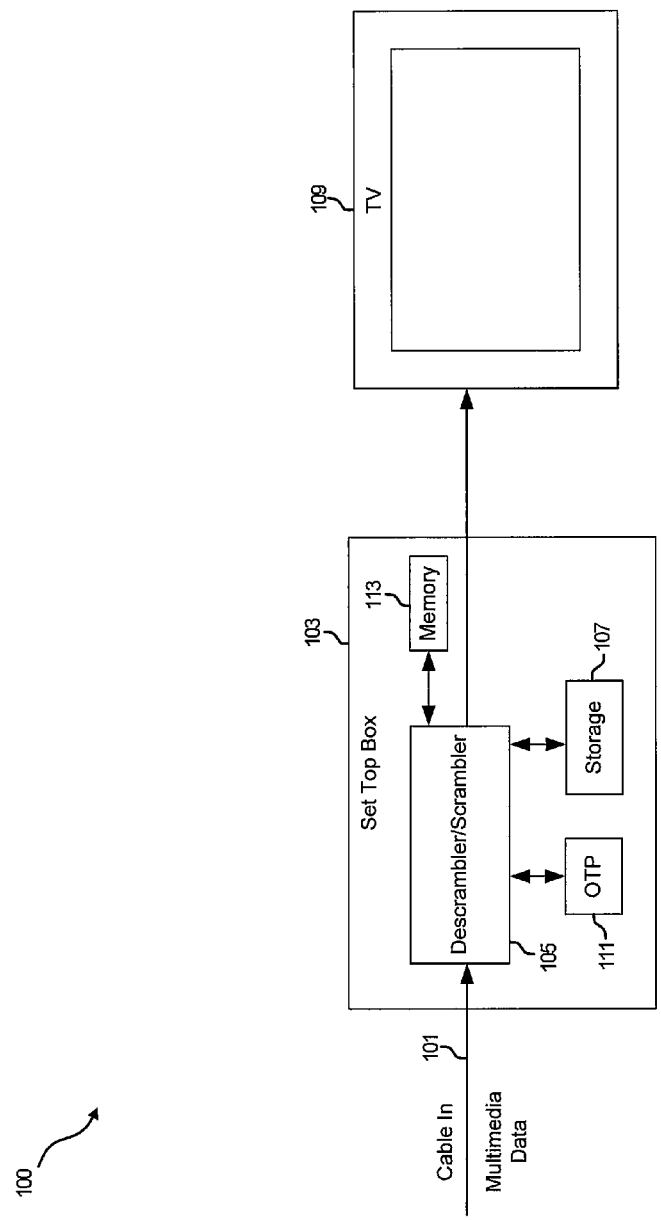
FIG. 1 is an exemplary conditional access descrambling/scrambling system, in accordance with an embodiment of the invention.

FIG. 1 is an exemplary conditional access descrambling/scrambling system, in accordance with an embodiment of the invention. Referring to FIG. 1, there is shown conditional access (CA) descrambling/scrambling system 100 comprising a cable input 101, a television 109 and a set-top box 103 comprising a descrambler/scrambler 105, a storage 107 and a one time programmable (OTP) memory 111.

The cable input 101 may communicate multimedia signals, which may be generated by a headend or service provider, and may comprise audio, video, data and/or voice, for example. The multimedia signals may comprise, for example, MPEG formatted multimedia information. The multimedia signals may comprise a plurality of scrambled data streams for a corresponding plurality of channels.

The set-top box 103 may comprise suitable circuitry, logic and/or code for receiving multimedia input signals and generating an output signal that may be displayed on the television 109. The set-top box 103 may comprise a demodulator that may be enabled to demodulate the plurality of data streams so as to provide content for one or more channels selected for viewing and/or recording.

The storage 107 may comprise suitable circuitry, logic and/or code that may be enabled to store multimedia data received from the cable input 101 that may have been descrambled by the descrambler/scrambler 105. Although a cable input 101 is shown, the invention is not so limited. Accordingly, other media inputs such as, for example, a satellite feed or a wireless network connection may be provided as an input to the set-top box 103.

The OTP 111 may comprise suitable circuitry, logic and/or code that may be enabled to store code for controlling operation of the set-top box 103. The bits of the OTP 111 may be set, or burned, once, and may not be reprogrammed.

The descrambler/scrambler 105 may comprise suitable circuitry, logic and/or code that may be enabled to receive a CA scrambled transport stream from, for example, the cable input 101 and descrambling the transport stream for decoding and/or display. The descrambler/scrambler 105 may be enabled to re-scramble the descrambled data for copy protection (CP) prior to storing on the storage 107.

In operation, a multimedia transport stream may be communicated to the set-top box 103 via the cable input 101. In instances where the multimedia transport stream may be scrambled for conditional access, for example, the descrambler/scrambler 105 may descramble the transport stream before communicating a signal to the television 109 and may CP scramble the descrambled data before storing the data from the descrambled multimedia transport stream in the storage 107. The descrambling keys may be obtained by the set-top box 103 from a separate PID channel in the transport stream, via an entitlement control message (ECM). Following descrambling, the descrambler/scrambler 105 may re-scramble the data before storing the data from the descrambled multimedia transport stream in the storage 107.

The conditional access (CA) descrambling/scrambling system 100 may comprise various exemplary functions such as a scrambling/descrambling function, an entitlement control function, and an entitlement management function. The scrambling/descrambling function may be designed to make the program incomprehensible to unauthorized receivers. Scrambling may be applied commonly or separately to the different elementary stream components of a program. For example, the video, audio and data stream components of a TV program may be scrambled in order to make these streams unintelligible. Scrambling may be achieved by applying various scrambling algorithms to the stream components. The scrambling algorithm may utilize one or more descrambling keys. Once the signal is received, the descrambling may be achieved by any receiver that holds the descrambling key, used by the scrambling algorithm prior to transmission. Scrambling and descrambling operations, in general, may not cause any impairment in the quality of the signals. The descrambling key used by the scrambling algorithm is a secret parameter known only by the scrambler and the authorized descramblers. In order to preserve the integrity of the encryption process, the control word may be changed frequently in order to avoid any exhaustive searches by an unauthorized user, which may be intended to discover the descrambling key.

The CA descrambling/scrambling system 100 may be enabled to scramble and/or randomize transmitted data bits so that unauthorized decoders may not decode the transmitted data bits. Authorized decoders may be delivered a key that may be utilized to initialize the circuit that inverts the data bit randomization. In addition to scrambling, a key may also be transformed into an encrypted key in order to protect it from any unauthorized users. In various embodiments of the invention, the CA system descrambling/scrambling system 100 may be enabled to utilize key encryption, and the encrypted keys may be securely distributed.

The CA descrambling/scrambling system 100 may be enabled to provide protection against signal piracy, efficient scrambling, flexibility, support for a variety of formats, and ease of implementation.

For CA or CP, private (secure) keys may be used for scrambling and descrambling high-value content or for protecting highly sensitive transactions. In a CA system, the content scrambling key may be protected. To ensure proper functionality, the CA system may perform scrambling according to the properties of the data for transmission. In addition, the CA system may be enabled to change the key regularly to maintain the security of the scrambling system, and transmit the key information to the receiver in a secure manner using, for example, a hierarchical encryption system.

The software code utilized to control the operation of the set-top box 103 may be customer, or user, specific, i.e. the set-top box may be utilized by multiple customers with each customer maintaining separate code to control the set-top box 103. Preliminary code versions, or test versions, loaded into the set-top box 103 may not incorporate full security, such that the it may be difficult to verify the validity of the test code, which may cause a security concern. This may be addressed by utilizing a secure hashing algorithm test hash, as described below.

When designing a secure reprogrammable system, there may be challenges associated with allowing the code to be tested by customers or even $3^{rd}$ parties. In general, customer site testing may track the following pattern: 1) Chip vendor may ship generic security CPU code to customers without security features. The customer-specific code may not yet be stable. 2) Customers may test non-security parts of the chip. 3) Chip vendor may ship new code with security features (Security CPU code stable). 4) Customers may use new code to test security features.

A system may be locked out from changing code by utilizing, for example, a hash such as a secure hashing algorithm (SHA) to create a digest that may be burned into the OTP 111. However, allowing customer or 3rd party test with unstable code may, in certain instances, result in the following choices: 1) allow 3rd party to continually reprogram the parts with no security so that the chip can be updated with the latest code eventually, 2) allow 3rd party to continually reprogram parts with a signature, or 3) have the chips be one time programmable, such that when the code is updated, a new chip must be provided. Choice 1 may, in certain instances, be a security problem, because anyone may load their own code. The 3rd party test house may not be very well trusted, and parts may have to be tracked closely to make sure every part is accounted for. This may be problematic for customers, who do not want others to be able to program parts with their code. Choice 2 may be problematic, since using a signature may imply a private key must be maintained. Since these may be test parts, for security reasons a separate key may be desirable that cannot be used in production code. This may result in additional logistical problems and storage for the extra keys. Using a common private key also may not provide market separation when the same part may be tested by two different 3rd parties. Choice 3 may be excessively costly because either the entire reference test board may be discarded when code is updated, or a costly socket must be placed on the board. To avoid these problems, a test hash may be utilized, and is further described with respect to FIG. 2.

Figure 2:
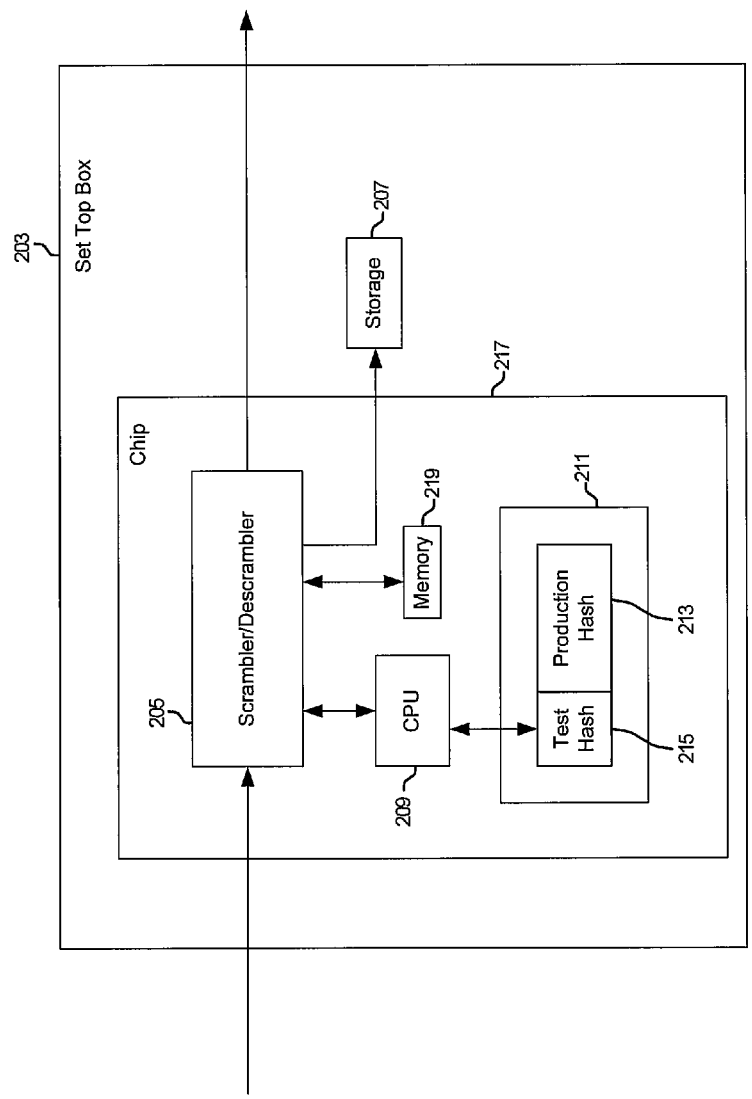
FIG. 2 is a block diagram illustrating an exemplary set-top box chip utilizing a test hash and a production hash for secure code, in accordance with an embodiment of the invention.

FIG. 2 is a block diagram illustrating an exemplary set-top box chip utilizing a test hash and a production hash for secure code, in accordance with an embodiment of the invention. Referring to FIG. 2, there is shown a set-top box 203, a set-top box chip 217 and a storage 207. The set-top box chip 217 may comprise a scrambler/descrambler 205, a CPU 209, and an OTP 211. The OTP 211 may comprise a test hash 215 and a production hash 213, and may comprise an M-bit OTP, for example. The set-top box 203, the scrambler/descrambler 205 and the storage 207 may be substantially similar to the set-top box 103, the scrambler/descrambler 105 and the storage 107, described with respect to FIG. 1.

The OTP 211 may comprise suitable circuitry, logic and/or code that may be enabled to store code for controlling operation of the set-top box 203. The bits of the OTP 211 may be set, or burned, once, and may not be reprogrammed. The test hash 215 may comprise a portion of the OTP 211 that may be utilized to store SHA data created from the initial, or test, code for the set-top box 203. The production hash 213 may comprise a portion of the OTP 211 that may be utilized to store SHA data created from the final, or production, code for the set-top box 203.

The CPU may comprise suitable circuitry, logic and/or code for controlling the various operations of the set-top box 203. The CPU 209 may comprise an integrated CPU, for example a MIPS processor. The software code utilized by the CPU 209 may be stored in the OTP 211.

In operation, an initial, or test version of software code may be "locked" within the set-top box chip 217 utilizing a hashing algorithm such as SHA, which may result in an SHA digest that may be stored in the test hash 215. The test code may comprise a minimal security mode for ease of testing and/or debugging. By utilizing the test hash 215, a chip supplier may supply the set-top box chip 217 with code locked in the OTP 211, to a customer, or user, where the customer may be developing the set-top box 203 code for multiple $3^{rd}$ parties, B and C, for example. In this manner, the customer may supply a set-top box with code developed by or for $3^{rd}$ party B that may not be used by $3^{rd}$ party C, and vice versa. This may be ensured by utilizing the test hash 215. When software is loaded into memory, it may be applied to the same SHA processing with the result being compared to the test hash 215. If the result of the SHA processing of the loaded software does not match the data stored in the test hash 215, the loaded software may not be allowed to function.

Once the production code is developed, the final, or production version of the code may be stored in the OTP 211 utilizing the SHA process. The resulting SHA digest may be burned into the production hash 213, and is described further with respect to FIG. 3A.

Figure 3A:
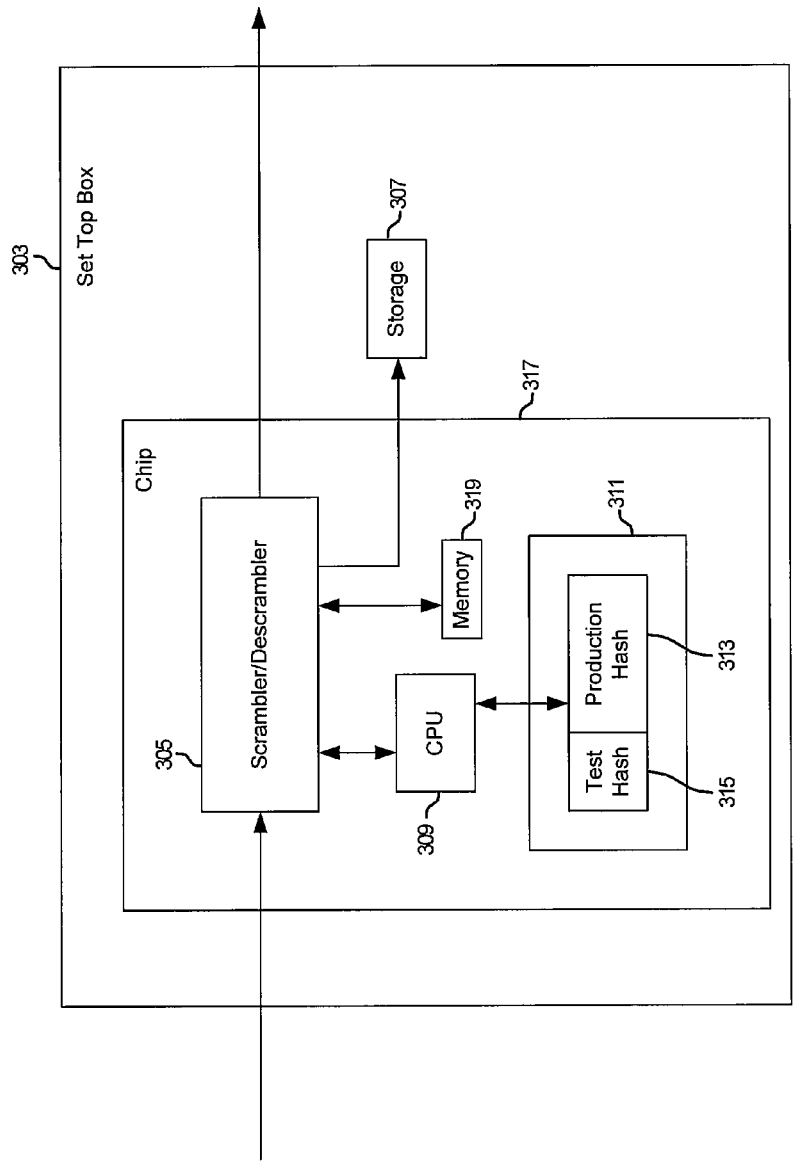
FIG. 3A is a block diagram illustrating an exemplary set-top box chip utilizing a test hash and a production hash for secure code, in accordance with an embodiment of the invention.

FIG. 3A is a block diagram illustrating an exemplary set-top box chip utilizing a test hash and a production hash for secure code, in accordance with an embodiment of the invention. Referring to FIG. 3A, there is shown a set-top box 303 comprising a set-top box chip 317 and a storage 307. The set-top box chip 317 and the storage 307 may be substantially similar to the set-top box 217 and the storage 207 described with respect to FIG. 2, with the exception that the production hash 313 may be utilized to store the code for the operation of the set-top box 303, as opposed to the test hash 315. The production hash may comprise a portion of the OTP 311 and may be stored after a tested and debugged version of the set-top box software code may be developed.

In operation, the process of switching code control from the test hash 315 to the production hash 313 may be password enabled, and may be specific to a single chip, so that a compromised password may not be reused to compromise or access any other set-top boxes. The password may only be known to the customer, so that the customer may decide whether or not to allow a $3^{rd}$ party to burn the production hash 213.

Figure 3B:
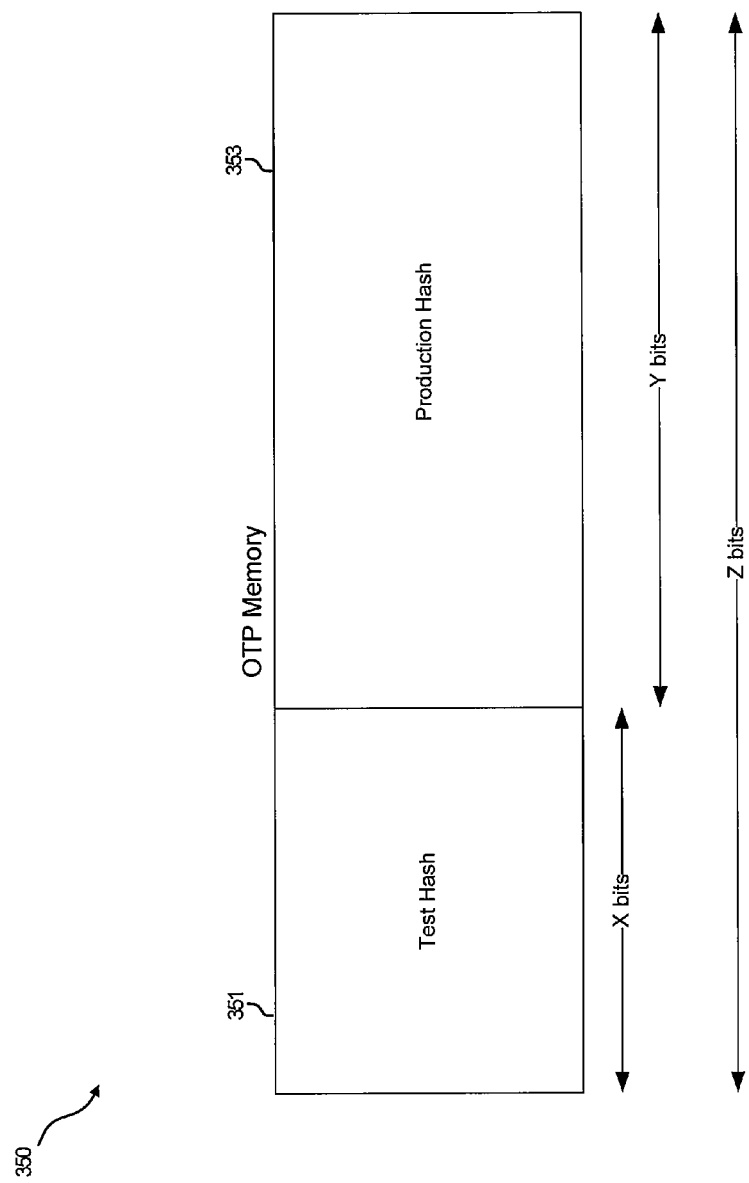
FIG. 3B is a block diagram of an exemplary one time programmable memory portioned into a test hash and a production hash, in accordance with an embodiment of the invention.

FIG. 3B is a block diagram of an exemplary one time programmable memory portioned into a test hash and a production hash, in accordance with an embodiment of the invention. Referring to FIG. 3B, there is shown OTP 350 comprising a test hash 351 and a production hash 353. The OTP 350 may be Z bits wide, the test hash 351 may be X bits wide and the production hash 353 may be Y bits wide, where X+Y=Z, and X may be less than or equal to Y.

In operation, the OTP 350 may be utilized to store the SHA digest generated from the hash of the test code and the production code, described with respect to FIG. 3A, and stored in the test hash 351 and the production hash 353, respectively. The stored data may be utilized to confirm software loaded by the set-top box 303, described with respect to FIG. 3A.

Figure 4:
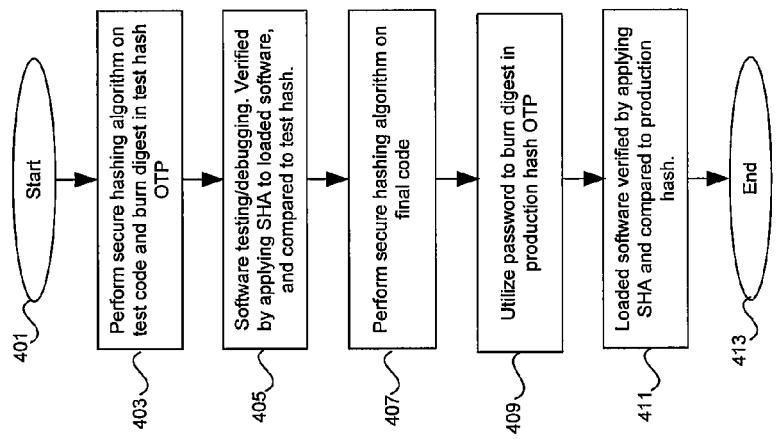
FIG. 4 is a flow diagram illustrating an exemplary set-top box secure code system utilizing a test hash and a production hash, in accordance with an embodiment of the invention.

FIG. 4 is a flow diagram illustrating an exemplary set-top box secure code system utilizing a test hash and a production hash, in accordance with an embodiment of the invention. Referring to FIG. 4, after start step 401, in step 403, a secure hashing algorithm process may be performed on a preliminary, or test version, of software code for set-top box control, and burned into the test hash 215 of the OTP 211. In step 405, loaded software may be verified by applying a hash algorithm such as SHA and comparing a corresponding result to the test hash 215. The verified software code may be debugged and/or tested to generate a final, or production, version of the software code, and in step 407, a secure hashing algorithm may be performed on the production code. In step 409, the hashed production code may be burned into the production hash 313 of the OTP 311 utilizing a unique per chip password. In step 411, loaded software into memory may be applied to the SHA process and compared to the production hash 313 before being allowed to execute, followed by end step 413.

In an embodiment of the invention, a method, system and machine-readable code are disclosed for verifying code loaded in a set-top box utilizing a test hash 215 or a production hash 313 prior to execution of the code, where the test hash 215 and production hash 313 may be stored in a memory, such as an OTP 311, within the set-top box 303, and may allow migration from corresponding test code to production code, which may be verified utilizing the test hash 215 and production hash 313, respectively. The test and production hashes may be customer specific. In another embodiment of the invention, the test code may be generic, or common to multiple customers or users, and the production code may be customer, or user specific. The migration from test code to production code may be authenticated using at least a set-top box specific password. The test hash may be stored in a first portion of a one-time programmable memory 311 and the production hash in a remaining portion, with the first portion being less than or equal to the remaining portion.

Certain embodiments of the invention may comprise a machine-readable storage having stored thereon, a computer program having at least one code section for communicating information within a network, the at least one code section being executable by a machine for causing the machine to perform one or more of the steps described herein.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for software security, the method comprising:
verifying code loaded in a device utilizing a test hash corresponding to test code and a production hash corresponding to production code, wherein said test hash and said production hash are stored in a memory within said device and cannot be reprogrammed; and
enabling execution of desired code based on said verification, said desired code comprising at least a portion of said verified code.

2. The method according to claim 1, wherein said memory comprises a one-time programmable memory.

3. The method according to claim 1, comprising verifying said test code utilizing said test hash.

4. The method according to claim 1, comprising verifying said production code utilizing said production hash.

5. The method according to claim 1, wherein said test hash and said production hash are specific to a customer.

6. The method according to claim 1, wherein said test hash is generic and said production hash is specific to a customer.

7. The method according to claim 1, further comprising migrating from said test code to said production code based on authentication of a password.

8. The method according to claim 7, wherein said authentication requires at least said password for said authentication.

9. The method according to claim 8, wherein said password is specific and unique to said device.

10. The method according to claim 1, comprising storing said test hash in a first portion of a one-time programmable memory and said production hash in a remaining portion of said one-time programmable memory.

11. The method according to claim 10, wherein said first portion of said one-time programmable memory is less than or equal to said remaining portion of said one-time programmable memory.

12. The method according to claim 1, further comprising programming of said test hash prior to programming of said production hash.

13. A system for software security, the system comprising:
one or more circuits that enables verifying code loaded in a device utilizing a test hash corresponding to test code and a production hash corresponding to production code, wherein said test hash and said production hash are stored in a memory within said device and cannot be reprogrammed,
said one or more circuits enabling execution of desired code based on said verification, said desired code comprising at least a portion of said verified code.

14. The system according to claim 13, wherein said memory comprises a one-time programmable memory.

15. The system according to claim 13, wherein said one or more circuits enables verification of said test code utilizing said test hash.

16. The system according to claim 13, wherein said one or more circuits enables verification of said production code utilizing said production hash.

17. The system according to claim 13, wherein said test hash and said production hash are specific to a customer.

18. The system according to claim 13, wherein said test hash is generic and said production hash is customer specific.

19. The system according to claim 13, wherein said one or more circuits enables migration from said test code to said production code based on authentication of a password.

20. The system according to claim 19, wherein said authentication requires at least said password for said authentication.

21. The system according to claim 20, wherein said password is specific and unique to said device.

22. The system according to claim 13, wherein said one or more circuits enables storing said test hash in a first portion of a one-time programmable memory and said production hash in a remaining portion of said one-time programmable memory.

23. The system according to claim 22, wherein said first portion of said one-time programmable memory is less than or equal to said remaining portion of said one-time programmable memory.

24. The system according to claim 13, wherein said one or more circuits enables programming of said test hash prior to programming of said production hash.

25. A non-transitory machine-readable storage having stored thereon, a computer program having at least one code section for software security, the at least one code section being executable by a machine for causing the machine to perform steps comprising:
   verifying code loaded in a device utilizing a test hash corresponding to test code and a production hash corresponding to production code, wherein said test hash and said production hash are stored in a memory within said device and cannot be reprogrammed; and
   enabling execution of desired code based on said verification, said desired code comprising at least a portion of said verified code.

26. The non-transitory machine-readable storage according to claim 25, wherein said memory comprises a one-time programmable memory.

27. The non-transitory machine-readable storage according to claim 25, wherein said at least one code section comprises code for enabling verification of said test code utilizing said test hash.

28. The non-transitory machine-readable storage according to claim 25, wherein said at least one code section comprises code for enabling verification of said production code utilizing said production hash.

29. The non-transitory machine-readable storage according to claim 25, wherein said test hash and said production hash are specific to a customer.

30. The non-transitory machine-readable storage according to claim 25, wherein said test hash is generic and said production hash is specific to a customer.

31. The non-transitory machine-readable storage according to claim 25, wherein said at least one code section comprises code for enabling migration from said test code to said production code based on authentication of a password.

32. The non-transitory machine-readable storage according to claim 31, wherein said at least one code section comprises code for enabling said authentication utilizing at least said password for said authentication.

33. The non-transitory machine-readable storage according to claim 32, wherein said password is specific and unique to said device.

34. The non-transitory machine-readable storage according to claim 25, wherein said at least one code section comprises code for enabling storage of said test hash in a first portion of a one-time programmable memory and said production hash in a remaining portion of said one-time programmable memory.

35. The non-transitory machine-readable storage according to claim 34, wherein said first portion of said one-time programmable memory is less than or equal to said remaining portion of said one-time programmable memory.

36. The non-transitory machine-readable storage according to claim 25, wherein said at least one code section comprises code for programming of said test hash prior to programming of said production hash.

* * * * *